United States Patent [19]
Marvich

[11] Patent Number: 5,149,271
[45] Date of Patent: Sep. 22, 1992

[54] BIG GAME CAPE GUIDE

[76] Inventor: Brian D. Marvich, 115 Park Rd., R.D. #3, Aliquippa, Pa. 15001

[21] Appl. No.: 810,156
[22] Filed: Dec. 19, 1991
[51] Int. Cl.$^5$ ............................................. G09B 23/00
[52] U.S. Cl. ..................................... 434/295; 119/96; 434/296
[58] Field of Search .................. 119/96, 156; 434/295, 434/296

[56] References Cited

U.S. PATENT DOCUMENTS

| | | | |
|---|---|---|---|
| 2,688,311 | 9/1954 | Pierce | 119/156 |
| 4,489,676 | 12/1984 | Colquist | 119/96 |
| 4,530,309 | 7/1985 | Collins | 119/96 |
| 4,559,906 | 12/1985 | Smith | 119/96 |
| 5,003,756 | 4/1991 | Mazzotta, Sr. | 119/156 X |

Primary Examiner—Gene Mancene
Assistant Examiner—L. Thomas
Attorney, Agent, or Firm—Clifford A. Poff

[57] ABSTRACT

To produce from a deer or the like a desirably high-quality hunting trophy, it is necessary to select a proper line of cut between the anterior and the posterior part of the animal. According to the invention, there is provided as a guide to enable such a cut to be obtained a garment, made of a pair of panels of fabric and adapted to enclose the forequarters of the animal, the garment having a rearward edge which defines the desired line of cut. Ideally, the panels have garment-interior edges which are adapted to be located adjacent to the backbone or spine of the animal and to accommodate for animals of different size, these garment-interior edges are connected by one or more elastic members other garment-exterior edges of the panels are provided with fastening means preferably strip of hook-and-eye material of the kind sold under the trademark "Velcro", to enable the garment to be fitted substantially snugly about the forequarters of the animal.

8 Claims, 2 Drawing Sheets

BIG GAME CAPE GUIDE

BACKGROUND OF THE INVENTION

1. Field of the Invention

This invention relates to the making of trophies of game animals of the kind which bear antlers or the like - animals which are in the broadest sense of the word, "deer", including such larger cervine animals as the wapiti or elk, the moose, and the reindeer or caribou, as well as smaller cervine animals as the antelope. More commonly understood as being designated by the term "deer". More particularly, it relates to an article of manufacture which is in the nature of a garment which is capable of being applied to the forequarter of recently harvested specimen of such an animal - a garment which posses a rearward edge which serves to locate a desirable line of cut to be used in order to prepare from said specimen a high-quality hunting trophy. In another aspect, the invention may be considered as relating to a method of preparing a game trophy with the aid of a garment of the kind indicated above.

2. Description of the Prior Art

The harvesting of antlered game and the preparation of hunting trophies from (usually) the more impressive ones of the animals taken by hunters is, of course, well known. It is also well known to skilled and experienced taxidermists, far better than it is known to a great majority of the hunters, at what location in the anatomy of the harvested animal there should be made, for the production of a desirable, realistic, high quality hunting trophy, a division between the anterior portion of the animal (containing the head and the antlers or rack) and the posterior portion of the animal (containing the parts which are not preserved and not shown). Many practicing taxidermists have had the occasion to observe that the hunters will very often make a cut, for such division, which is poorly located in the cases where the production of some kind of wall-mountable trophy is desired. All too frequently, a hunter will make such a cut in a way that the antlers cannot be kept clear of the supporting wall, at least when the head is to be oriented in some appropriately erect, alert-looking position.

BRIEF SUMMARY OF THE INVENTION

To produce from a deer or the like a desirably high-quality hunting trophy, it is necessary to select a proper line of cut between the anterior and the posterior part of the animal. According to the invention, there is provided as a guide to enable such a cut to be obtained a garment, made of a pair of panels of fabric and adapted to enclose the forequarters of the animal, the garment having a rearward edge which defines the desired line of cut. Ideally, the panels have garment - interior edges which are adapted to be located adjacent to the backbone or spine of the animal and to accommodate for animals of different size, these garment - interior edges are connected by one or more elastic members other garment - exterior edges of the panels are provided with fastening means preferably strip of hook-and-loop material of the kind sold under the trademark "VELCRO" to enable the garment to be fitted substantially snugly about the forequarters of the animal.

DESCRIPTION OF THE DRAWINGS

A complete understanding of the invention may be obtained from the foregoing and following description thereof, taken in conjunction with the appended drawings, in which.

DESCRIPTION OF THE PREFERRED EMBODIMENT

Figure 1:
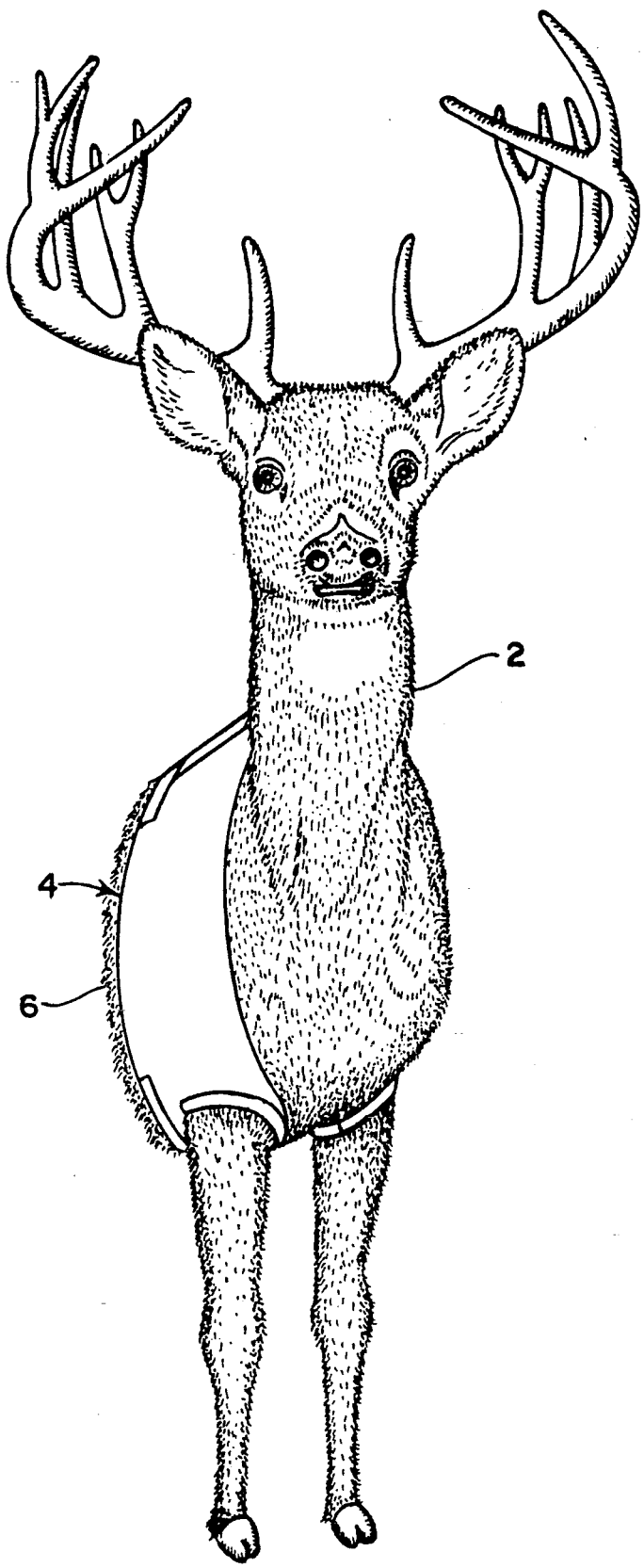
FIG. 1 is an overall perspective view of a wall-mounted specimen prepared according to the method of the present invention and with the use of a garment according to the present invention.

As can be seen for FIG. 1, the invention yields a wall-mounted trophy of a deer 2 with the use of a garment 4 according to the invention. The garment 4 has a posterior edge 6 which defines a line of cut between the anterior portion of the harvested deer, which is applied to other uses or discarded.

Figure 2:
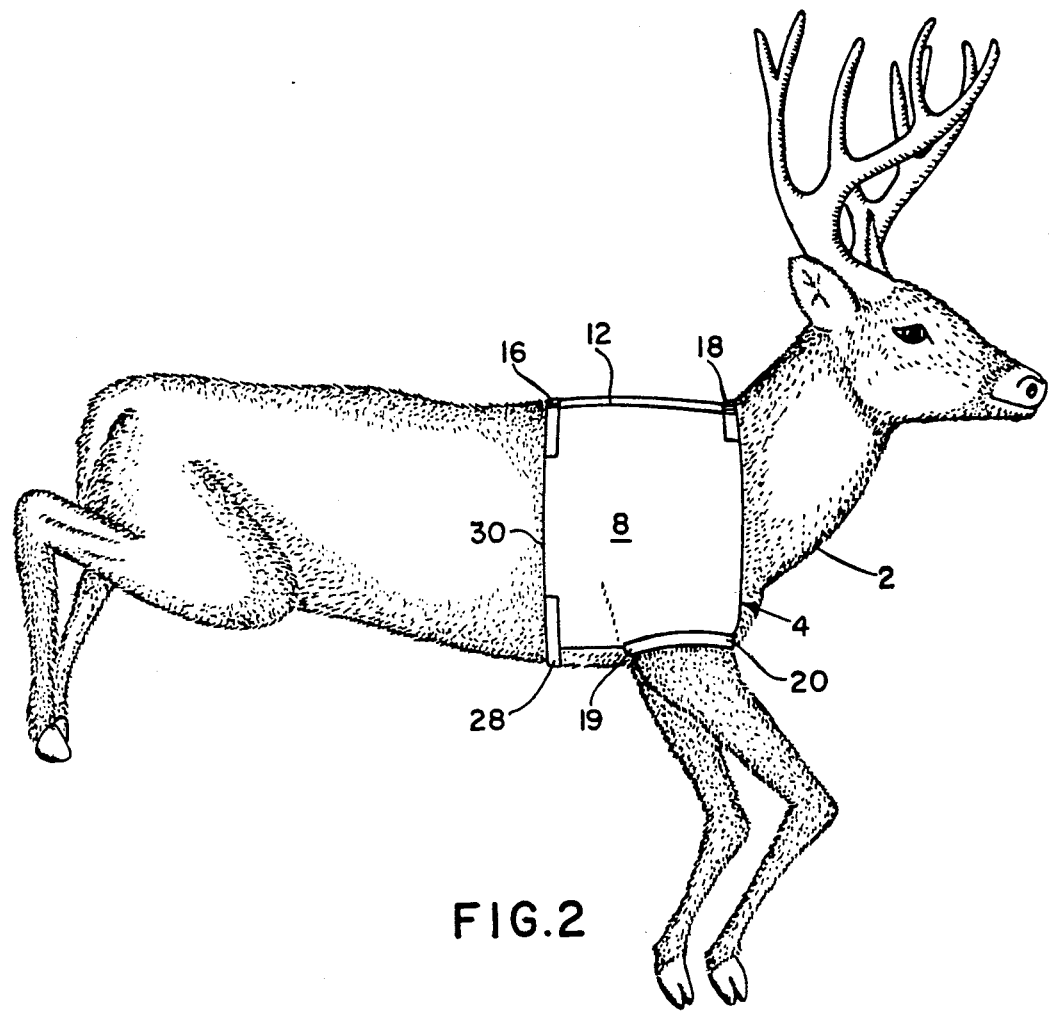
FIG. 2 is a side elevational view of the specimen shown is FIG. 1.
Figure 3:
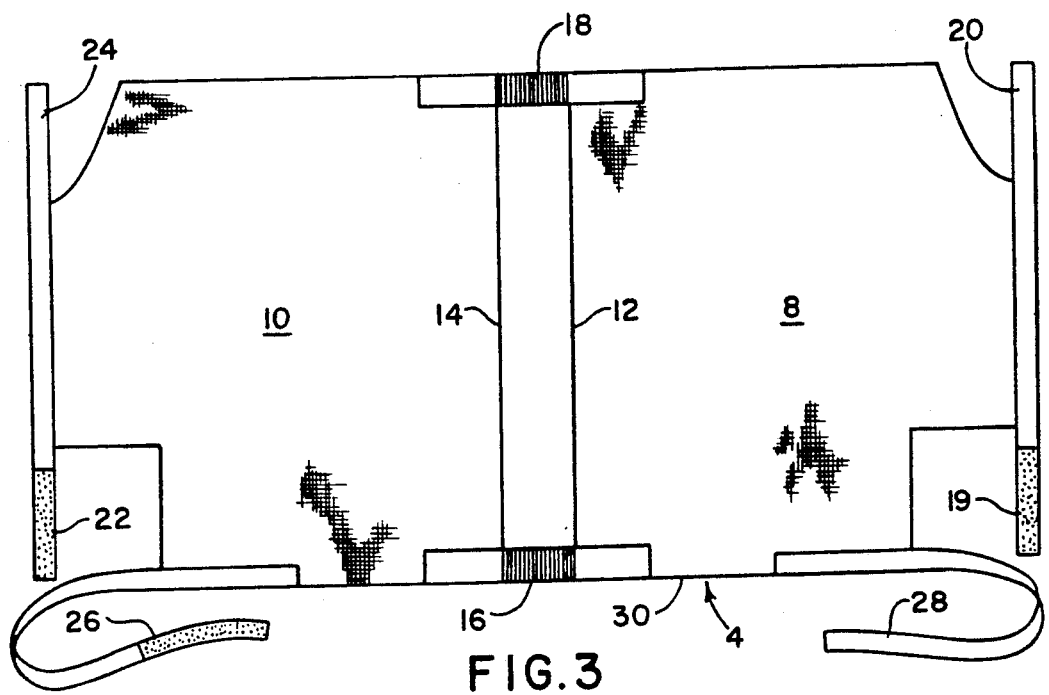
FIG. 3 is a plan view of one embodiment of a garment according to the invention.

As can be better seen in FIGS. 2 and 3, the garment 4 of the invention preferably comprises a pair of substantially congruent panels 8 and 10 which have garment - interior edges 12 and 14, respectively. The edges 12 and 14 are positioned substantially adjacent to the backbone or spine of the deer 2. In the depicted embodiment of the invention a pair of elastic members 16 and 18 join the aforesaid edge 12 and 14 to accommodate the use of the garment 4 of the invention with deer of different sizes.

Moreover, according to the invention, the garment 4 preferably contains, along certain ones of the garment - exterior edges thereof suitable fastening means, such as strips 19, 20, 22, 24, 26 and 28 of hook-and-eye material sold commercially under the trademark "VELCRO" - although those skilled in the art will readily appreciate that other fastening means such as snaps or buttons could be substituted.

In use the garment 4 is applied to the deer 2 and a cut is taken along the rearward or posterior edge 30 of the garment 4, after it has been secured substantially snugly about the deer 4, as by joining the strips 19 and 20 to surround the nearer one of the legs of the deer (as shown in FIGS. 1 and 2) and by joining the strips 26 and 28 in the vicinity of the deer's belly.

The with respect to a line of cut including the considerations that the line of cut should be substantially vertical with respect to the animal when it is in a standing position and that the line of cut is to be so sufficiently far towards the rear or posterior end of the animal to avoid intersecting any part of the antlers or rack of the animal, and indeed sufficiently to the rear to permit some desired degree of clearance between the back portions of the antlers or rack and the wall selected for the mounting of the trophy.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A garment adapted to be fitted substantially snugly about the forequarters of a cervine animal, said garment having when applied to said animal a rearward edge defining a line of cut for trophy-production purposes.

2. In a method of producing a hunting trophy, the improvement which comprises the steps of applying to a specimen of harvested cervine animal a garment as defined in claim 1 and effecting a cut between the anterior and the posterior portions of said specimen along a line defined by a rearward edge of said garment.

3. A garment as defined in claim 1 wherein said edge defines a plane of cut which is a substantially vertical with respect to said animal when it is in a standing position and to sufficiently far towards the rear of said animal as to avoid intersecting any portion of the anterior or rack of said animal.

4. In a method of producing a hunting trophy, the improvement which comprises the steps of applying to a specimen of harvested cervine animal a garment as defined in claim 3 and effecting a cut between the anterior and the posterior portions said specimen along a line defined by a rearward edge of said garment.

5. A garment as defined in claim 3 wherein said garment comprises a pair of congruent panels each of said panels having a garment interior edge adapted to be located adjacent to the backbone of said animal, the exterior edges of said panels comprising means for joining said panels together.

6. In a method of producing a hunting trophy, the improvement which comprises the steps of applying to a specimen of harvested cervine animal a garment as defined in claim 5 and effecting a cut between the anterior and the posterior portions of said specimen along a line defined by a rearward edge of said garment.

7. A garment as defined in claim 5 said means for joining said panels together being strips of hook-and-loop material.

8. In a method of producing a hunting trophy, the improvement which comprises the steps of applying to a specimen of harvested cervine animal a garment as defined in claim 7 and effecting a cut between the anterior and the posterior portions of said specimen along a line defined by a rearward edge of said garment.

* * * * *